United States Patent
Guggilla et al.

(10) Patent No.: US 10,318,625 B2
(45) Date of Patent: Jun. 11, 2019

(54) TABLE NARRATION USING NARRATION TEMPLATES

(71) Applicant: International Business Machines Corporation, Armonk, NY (US)

(72) Inventors: Chinnappa Guggilla, Bangalore (IN); Ashish Mungi, Bangalore (IN); Purushothaman K. Narayanan, Bangalore (IN); Ankur S. Parikh, Bangalore (IN); Krishma Singla, Bangalore (IN); Bijo A. Thomas, Thiruvalla (IN)

(73) Assignee: International Business Machines Corporation, Armonk, NY (US)

( * ) Notice: Subject to any disclaimer, the term of this patent is extended or adjusted under 35 U.S.C. 154(b) by 102 days.

(21) Appl. No.: 14/275,993

(22) Filed: May 13, 2014

(65) Prior Publication Data

US 2015/0331845 A1    Nov. 19, 2015

(51) Int. Cl.
*G06F 17/24* (2006.01)
*G06F 17/27* (2006.01)
(Continued)

(52) U.S. Cl.
CPC ........ *G06F 17/246* (2013.01); *G06F 16/9017* (2019.01); *G06F 17/272* (2013.01); *G06F 17/2705* (2013.01); *G06F 17/28* (2013.01)

(58) Field of Classification Search
CPC .... G06F 17/2881; G06F 17/28; G06F 17/245; G06F 17/248; G06F 17/30011; G06F 17/30634; G10L 13/08
(Continued)

(56) References Cited

U.S. PATENT DOCUMENTS

| 6,968,316 B1 * | 11/2005 | Hamilton | ............... G06Q 40/02 705/36 R |
| 8,275,803 B2 | 9/2012 | Brown et al. | |

(Continued)

FOREIGN PATENT DOCUMENTS

| WO | 2004102316 A2 | 11/2004 |
| WO | 2009140473 A1 | 11/2009 |
| WO | 2012069490 A1 | 5/2012 |

OTHER PUBLICATIONS

Byron et al, "U.S. Appl. No. 13/778,901," p. 1-42, filed Feb. 27, 2013.
(Continued)

*Primary Examiner* — Richemond Dorvil
*Assistant Examiner* — Mark Villena
(74) *Attorney, Agent, or Firm* — Richard A. Wilhelm

(57) ABSTRACT

A computer system for narrating a table using at least one narration template, wherein the table is extracted from a data source is provided. The computer system may include parsing the extracted table. The computer system may also include performing structural analysis on the parsed extracted table. The computer system may further include selecting at least one structural template based on the structural analysis of the parsed extracted table. Additionally, the computer system may include selecting the at least one narration template based on the at least one selected structural template. The computer system may also include applying the at least one selected narration template to the extracted table. The computer system may further include narrating the extracted table based on the applying of the at least one selected narration template to the extracted table.

12 Claims, 11 Drawing Sheets

(51) Int. Cl.
*G06F 17/28* (2006.01)
*G06F 16/901* (2019.01)

(58) Field of Classification Search
USPC ....... 704/9; 707/804, 999.003; 715/249, 254
See application file for complete search history.

(56) References Cited

U.S. PATENT DOCUMENTS

| | | | |
|---|---|---|---|
| 8,762,428 B2 | 6/2014 | Kulack et al. | |
| 9,053,085 B2 | 6/2015 | Dubbels | |
| 2003/0229854 A1 | 12/2003 | Lemay | |
| 2006/0173834 A1* | 8/2006 | Brill | G06F 17/30554 |
| 2007/0219970 A1* | 9/2007 | Dunie | G06F 17/30011 |
| 2009/0248490 A1* | 10/2009 | Moncreiff | G06Q 10/0637 |
| | | | 705/7.34 |
| 2009/0265655 A1* | 10/2009 | Fiedler | G06F 17/2785 |
| | | | 715/780 |
| 2009/0287678 A1 | 11/2009 | Brown et al. | |
| 2011/0246182 A1* | 10/2011 | Allen | G06F 17/248 |
| | | | 704/9 |
| 2011/0295606 A1* | 12/2011 | Ben-Ezri | G10L 13/08 |
| | | | 704/260 |
| 2012/0209626 A1 | 8/2012 | Carus et al. | |
| 2013/0007033 A1 | 1/2013 | Brown et al. | |
| 2013/0144606 A1* | 6/2013 | Birnbaum | G06F 17/2881 |
| | | | 704/9 |
| 2013/0144863 A1* | 6/2013 | Mayer | G06F 21/6218 |
| | | | 707/711 |
| 2013/0173673 A1* | 7/2013 | Miller | A63F 13/00 |
| | | | 707/804 |
| 2013/0174026 A1* | 7/2013 | Locke | G06Q 10/10 |
| | | | 715/254 |
| 2013/0185050 A1 | 7/2013 | Bird et al. | |
| 2013/0211855 A1* | 8/2013 | Eberle | A61N 1/37282 |
| | | | 705/3 |
| 2013/0262092 A1* | 10/2013 | Wasick | G06F 17/28 |
| | | | 704/9 |
| 2014/0007257 A1* | 1/2014 | Dougherty | G09B 5/062 |
| | | | 726/28 |
| 2014/0013204 A1* | 1/2014 | Theis | G06F 17/24 |
| | | | 715/234 |
| 2014/0031114 A1* | 1/2014 | Davison | A63F 13/65 |
| | | | 463/31 |
| 2014/0114707 A1* | 4/2014 | Rope | G06Q 10/10 |
| | | | 705/7.11 |
| 2014/0122535 A1 | 5/2014 | Gerard et al. | |
| 2014/0229815 A1* | 8/2014 | Clifford | G06F 17/243 |
| | | | 715/224 |
| 2014/0278351 A1 | 9/2014 | Clark et al. | |
| 2014/0278352 A1 | 9/2014 | Clark et al. | |
| 2014/0278358 A1* | 9/2014 | Byron | G06F 17/245 |
| | | | 704/9 |
| 2014/0280352 A1* | 9/2014 | Sam | G06F 17/30917 |
| | | | 707/793 |
| 2014/0281935 A1* | 9/2014 | Byron | G06F 17/245 |
| | | | 715/249 |
| 2014/0297565 A1* | 10/2014 | Montgomery | G06Q 40/06 |
| | | | 705/36 R |
| 2014/0316768 A1* | 10/2014 | Khandekar | G06F 17/30654 |
| | | | 704/9 |
| 2015/0142418 A1* | 5/2015 | Byron | G06F 17/28 |
| | | | 704/9 |

OTHER PUBLICATIONS

Byron et al, "U.S. Appl. No. 13/838,130," p. 1-47, filed Mar. 15, 2013.
Byron et al, "U.S. Appl. No. 13/925,015," p. 1-58, filed Jun. 24, 2013.
Byron et al, "U.S. Appl. No. 13/932,435," p. 1-48, filed Jul. 1, 2013.
Byron et al, "U.S. Appl. No. 13/945,259," p. 1-56, filed Jul. 18, 2013.
Chen et al, "Disseminating Natural Language Processed Clinical Narratives," AMIA 2006 Symposium Proceedings, 2006, p. 126-130.
Corville et al, "U.S. Appl. No. 14/262,288," p. 1-48, filed Apr. 25, 2014.
CL Research, "The Preposition Project," Last Updated Aug. 21, 2007, p. 1-18, Maintained by Ken Litkowski, http://www.clres.com/prepositions.html, Accessed on Apr. 9, 2014.
Farlex, "hypernym—definition of hypernym by the Free Online Dictionary," thefreedictionary.com, p. 1, http://www.thefreedictionary.com/hypernym, Accessed on Apr. 9, 2014.
Hu et al, "Avoiding Store Misses to Fully Modified Cache Blocks", Performance Computing and Communications Conference, 2006, p. 289-296, IPCCC 2006, 25th IEEE International.
Princeton University, "WordNet: A lexical database for English," Last Update: Nov. 7, 2013, p. 1-3, The Trustees of Princeton University, http://wordnet.princeton.edu/wordnet/, Accessed on Apr. 9, 2014.
UN, "Making Accessible Websites for the United Nations," p. 1-3, UN Web Services Section, Department of Public Information, http://www.un.org/webaccessibility/3_text/33_datatables.shtml, Accessed on Apr. 9, 2014.
Wikipedia, "WordNet," Last Modified on Apr. 6, 2014, p. 1-10, Wikipedia: the free encyclopedia, http://en.wikipedia.org/wiki/WordNet, Accessed on Apr. 9, 2014.
Cardelli, "Describing Semistructured Data," SIGMOD Record, Dec. 2001, p. 1-6, vol. 30, Issue 4, ACM, Microsoft Research.
Hajishirzi et al., "Symbolic Probabilistic Reasoning for Narratives," Tenth International Symposium on Logical Formalizations of Commonsense Reasoning (Commonsense'11), 2011, 6 Pages, University of Illinois at Urbana-Champaign, IBM TJWatson.
IBM, "List of IBM Patents or Patent Applications Treated as Related (Appendix P)," Oct. 15, 2015, p. 1-2.
Guggilla et al., "Table Narration Using Narration Templates," Application and Drawings, Filed on Aug. 25, 2014, 37 Pages, U.S. Appl. No. 14/467,177.

* cited by examiner

200

202

Table: Insurance Example

| Insurance Type | Age at Application | Sum Insured ($) | | Accident Benefit ($) | |
| --- | --- | --- | --- | --- | --- |
| | | Minimum | Maximum | Minimum | Maximum |
| Life Insurance | 0 - 18 | 0 | 0 | 0 | 0 |
| | 18 - 59 | $5,000 | $1,000,000 | 0 | 10% of sum insured |
| | 60 - 70 | $10,000 | $100,000 | 0 | 0 |
| Health Insurance | 0 - 18 | $5,000 | $10,000 | 0 | 0 |
| | 18 - 59 | $5,000 | $100,000 | 0 | 0 |
| | 60 - 70 | $10,000 | $50,000 | 0 | 0 |

Table: Invoice Example

| Item | Price Per Unit ($) | Discount % | Discount ($) | Quantity | Total Amount ($) |
| --- | --- | --- | --- | --- | --- |
| Category 1: Stationery | | | | | |
| Pen | $1.00 | 10% | $0.10 | 1 | $0.90 |
| Pencil | $0.50 | 0 | 0 | 2 | $1.00 |
| Notebook | $2.00 | 25% | $0.50 | 1 | $1.50 |
| | | | | Category 1 Sub-Total | $3.40 |
| Category 2: Other Items | | | | | |
| Adhesive | $3.00 | 0 | 0 | 1 | $3.00 |
| Glue | $4.00 | 0 | 0 | 2 | $8.00 |
| | | | | Category 2 Sub-Total | $11.00 |
| | | | | Total | $14.40 |

Funds : Payout Example

| Name | Dividend ($ per unit) | Payout % |
|---|---|---|
| Fund 1 | $2 | 2% |
| Fund 2 | $4 | 1.8% |
| Fund 3 | $6 | 8% |
| Fund 4 | $20 | 15% |

Funds : Payout Example

| Name | Dividend ($ per unit) | Payout % |
|---|---|---|
| Fund 1 | $2 | 2% |
| Fund 2 | $4 | 1.8% |
| Fund 3 | $6 | 8% |
| Fund 4 | $20 | 15% |

Table: Comparison of Four Wheelers and Two Wheelers

|  | Four Wheeler | Two Wheeler |
|---|---|---|
| Definition | Any vehicle that has 4 wheels such as car, bus, truck, etc | Any vehicle that has two wheels such as bicycle, motorbike, etc |
| Policy Type | Four Wheeler Insurance | Bike Insurance |

Table: Comparison of Four Wheelers and Two Wheelers

| | Four Wheeler | Two Wheeler |
|---|---|---|
| Definition | Any vehicle that has 4 wheels such as car, bus, truck, etc | Any vehicle that has two wheels such as bicycle, motorbike, etc |
| Policy Type | Four Wheeler Insurance | Bike Insurance |

FIG. 6

| Sample Narration Formula | Explanation |
|---|---|
| {%cell(1)%; %cell(2)%} | The notation { ... } is used to define the start and end of a cell or row (depending on whether the formula is cell level or row level. The variables are denoted as %variable%. |
| | In this example, %cell(1)% and %cell(2)% denote cells 1 and 2 of the row or table (depending on formula scope). |
| | The formula will be resolved to: |
| | <Contents of Cell1>; <Contents of Cell2> |
| | This formula may be typically used for tables with 2 columns but no headers (no header rows or columns). It may also be used for tables with 2 columns where the first column is a header column. |
| if {%HeaderRowCell(1)% is %cell(1)%}, then {%HeaderRowCell(N-1)% is %cell(N-1)%}, and {%HeaderRowCell(N)% is %cell(N)%}. | In this narration formula, the variable %HeaderRowCell(N)% refers to the Header Row Cell (N), whereas cell(N) represents a normal cell(N). |
| | A table may contain any number of columns (1, 2 ...N) for the same table pattern, hence the narration formula must be able to accommodate any number of columns. |
| | The number of columns in a given table can be determined at runtime when the table structure is analyzed, and thus the number of columns (N) will be known when the formula is interpreted. |
| | The variable N refers to the last column, and (N-1) refers to the column numbers except the last column, and will be interpreted and substituted at runtime. |
| | For a 4-column table, the formula interpreted at runtime would be: |
| | If %HeaderRowCell(1)% is %cell(1)%, then %HeaderRowCell(2)% is %cell(2)%, %HeaderRowCell(3)% is %cell(3)%, and %HeaderRowCell(4)% is %cell(4)%. |
| {%Header(1)%} are {%cell(1)%}, {%cell(N-1)%}, and {%cell(N)%}. | This narration formula uses the same concepts outlined above. In addition, it also factors PLURALITY for the header contents ("are" instead of "is".) |

FIG. 9

TABLE NARRATION USING NARRATION TEMPLATES

FIELD OF THE INVENTION

The present invention relates generally to the field of computing, and more particularly to table narration

BACKGROUND

Unstructured data sources and web pages may contain semi-structured information in the form of tables. The tables may contain different types of structured and unstructured data such as unformatted text, formatted text, photos or images, URLs or links, etc. Tables may be narrated so that the original table contents containing semi-structured or structured data may be converted into a set of equivalent natural language sentences and paragraphs. However, different tables may have various types of structural patterns and different types of content which may require a different type of narration for each table.

SUMMARY

According to one embodiment, a method for narrating a table using at least one narration template, wherein the table is extracted from a data source is provided. The method may include parsing the extracted table. The method may also include performing structural analysis on the parsed extracted table. The method may further include selecting at least one structural template based on the structural analysis of the parsed extracted table. Additionally, the method may include selecting the at least one narration template based on the at least one selected structural template. The method may also include applying the at least one selected narration template to the extracted table. The method may further include narrating the extracted table based on the applying of the at least one selected narration template to the extracted table.

According to another embodiment, a computer system for narrating a table using at least one narration template, wherein the table is extracted from a data source is provided. The computer system may include one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method. The method may include parsing the extracted table. The method may also include performing structural analysis on the parsed extracted table. The method may further include selecting at least one structural template based on the structural analysis of the parsed extracted table. Additionally, the method may include selecting the at least one narration template based on the at least one selected structural template. The method may also include applying the at least one selected narration template to the extracted table. The method may further include narrating the extracted table based on the applying of the at least one selected narration template to the extracted table.

According to yet another embodiment, a computer program product for narrating a table using at least one narration template, wherein the table is extracted from a data source is provided. The computer program product may include one or more computer-readable storage devices and program instructions stored on at least one of the one or more tangible storage devices, the program instructions executable by a processor.

The computer program product may also include program instructions to parse the extracted table. The computer program product may also include program instructions to perform structural analysis on the parsed extracted table. The computer program product may further include program instructions to select at least one structural template based on the structural analysis of the parsed extracted table. Additionally, the computer program product may include program instructions to select the at least one narration template based on the at least one selected structural template. The computer program product may also include program instructions to apply the at least one selected narration template to the extracted table. The computer program product may further include program instructions to narrate the extracted table based on the applying of the at least one selected narration template to the extracted table.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 2 illustrates the basic elements or constructs of a table according to one embodiment;

FIG. 3 illustrates an example of horizontal narration according to one embodiment;

FIG. 4 illustrates an example of horizontal narration with comparison according to one embodiment;

FIG. 5 illustrates an example of vertical narration according to one embodiment;

FIG. 6 illustrates an example of vertical narration with comparison according to one embodiment;

FIG. 9 illustrates examples of narration formulas according to one embodiment;

DETAILED DESCRIPTION

Figure 1:
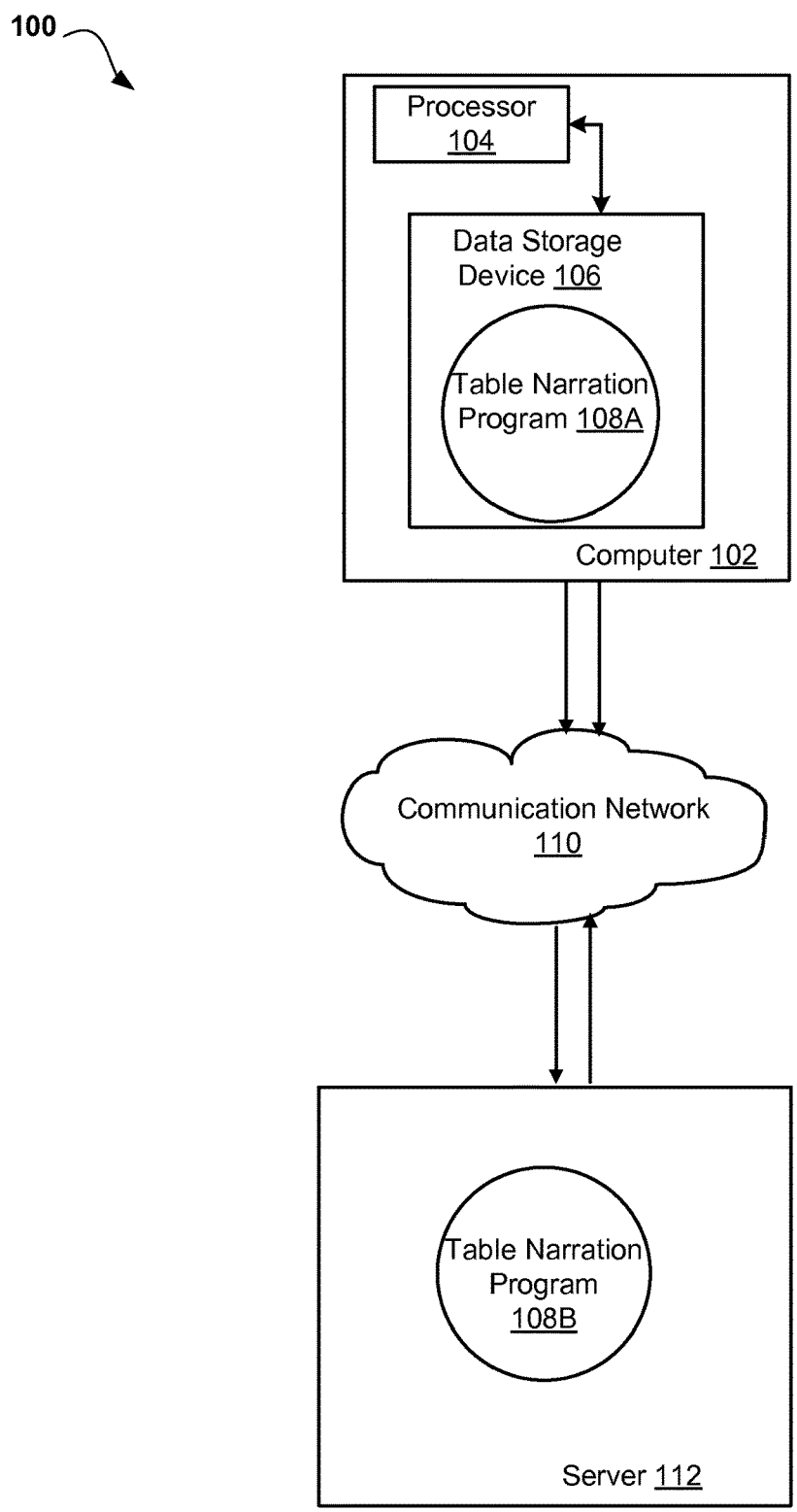
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly to table narration. The following described exemplary embodiments provide a system, method and program product for table narration using narration templates.

As previously described, unstructured data sources, such as documents and web pages (e.g., HTML or XML), may contain semi-structured information in the form of tables. The tables may contain different types of structured and unstructured data such as unformatted text, formatted text (e.g., paragraphs, sentences, bulleted or numbered lists), photos or images, URLs or links, etc. Currently, tables may be narrated so that the original table contents containing semi-structured or structured data may be converted into a set of equivalent natural language sentences and paragraphs. However, different tables may have various types of structural patterns and different types of content. As such, it may be very difficult to narrate all types of tables in a generalized manner. Furthermore, there currently is no generic approach available which may be used to narrate all types of tables with different structural patterns and different types of content in a standardized and consistent manner. Also, current table narration approaches may not be flexible and scalable, and may not be based on templates. As such, the current table narration approaches may require custom programming based in different table structures and contents since the current table narration approaches may not be based on templates. Therefore, it may be advantageous, among other things, to provide a flexible and scalable solution which may minimize code changes and may generalize table narration for all types of tables and table structures.

Table narration may be the conversion and description of the contents of a table (i.e., semi-structured data) into free form natural language sentences and paragraphs, so that the resulting narration may be equivalent to the original table contents and meaning. According to at least one embodiment, table narration may be implemented using natural language processing (NLP) concepts. The present embodiment may define the concept of narration templates and the key elements (i.e., schema) for narration templates and structural templates. The present embodiment may also define the concept of a narration formula, and its usage to narrate a table at a cell level, row level, column level or any other type of generic region defined within the table. As such, the narration formula may make use of NLP (natural language processing concepts) and thus NLP may be used to narrate tables in a generic way. The narration formula may also be modified as required to improve the narration, depending on the table contents.

Furthermore, according to at least one embodiment, the linkage of a narration template to the structure of a table through the definition and use of structural templates and a mapping mechanism may be implemented. Also, structural templates and narration templates may be stored in a repository (such as a database or a file system), and each structural template may map to, be linked with, or be associated with one or more narration templates through a "template mapping", such as a mapping file, hashmap, dictionary, linked list or any other type of mapping mechanism which may be used to store the mapping between a structural template and a narration template or the mapping between a narration template and a structural template. The present embodiments may define the concepts of horizontal narration; vertical narration; horizontal narration with comparison of a narration template across rows or groups of rows; and vertical narration with comparison across columns or groups of columns in a table. Additionally, the present embodiments may define how the narration templates may be used for these various types of narration in a generic way.

According to at least one implementation, the narration templates may be linked to the structure of a table by mapping structural templates and narration templates. As such, the mapping of the structural templates and the narration templates may help in determining the narration templates applicable and relevant to a particular table based on its structural pattern. Furthermore, tables in documents or web pages may be extracted, parsed and analyzed for their structure and layout. Then based on the structural analysis of a table, the applicable "structural template" may be determined. The "structural template" may depict the key elements of the table structure that are necessary to determine the applicable narration templates. Therefore, based on the structural template determined for the given table, the set of (one or more) applicable narration templates may be determined by looking up the "template mapping". Furthermore, for a given structural template, if more than one narration template may be applicable, then additional rules or criteria may be used to deselect or select one narration template from the set of applicable narration templates. Additionally, the given table may be narrated by "applying" the selected narration template to the table to get the resultant table narration.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for table narration using narration templates. As previously described, table narration is the conversion and description of the contents of a table (i.e., semi-structured data) into free form natural language sentences and paragraphs, so that the resulting narration may be equivalent to the original table contents and meaning. According to the present embodiment, narration templates, structural templates, and the corresponding schemas may be implemented. Additionally, a narration formula using natural language processing (NLP) techniques may be implemented. As such, the narration formulas may be used to narrate a table in a generic way at cell level, row level, column level or any other type of generic region defined within the table. Therefore, the generic mechanism may link and map narration templates to structural templates. Additionally, according to at least one implementation, narration techniques, such as horizontal narration; vertical narration; horizontal narration with comparison across rows or groups of rows; and vertical narration with comparison across columns or groups of columns in a table may be implemented and used for these various types of narration in a generic way.

Referring now to FIG. 1, an exemplary networked computer environment 100 in accordance with one embodiment is depicted. The networked computer environment 100 may include a computer 102 with a processor 104 and a data storage device 106 that is enabled to run a table narration program 108A. The networked computer environment 100 may also include a server 112 that is enabled to run a table narration program 108B and a communication network 110. The networked computer environment 100 may include a plurality of computers 102 and servers 112, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 10, server computer 112 may include internal components 800a and external components 900a, respectively and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing device capable of running a program and accessing a network.

A program, such as a table narration program 108A and 108B may run on the client computer 102 or on the server computer 112. The table narration program 108A, 108B may be utilized to narrate a table using narration templates. For example, a user using a table narration program 108A, running on a client computer 102 may connect via a communication network 110 to server computer 112 which may also be running a table narration program 108B. Furthermore, the user using client computer 102 or server 112 may utilize the table narration program 108A, 108B to generically narrate a table using narration templates. The table narration method is explained in further detail below with respect to FIGS. 7A-7B.

Referring now to FIG. 2, an example of the basic elements or constructs of a table 200 in accordance with one embodiment is depicted. As previously explained, table processing and narration in a generic manner may be a complex problem, and currently there are no known solutions for narration of all different types of tables in a generic way, without custom coding. Tables may be represented in multiple formats, depending on the source document formats such as HTML, PDF, documents, spreadsheets, presentations, XML, etc. Additionally, tables may have various types of structural patterns (e.g., combination of cells, rows and columns) in different layouts (e.g., tables with a caption 202, tables with normal cells 204 tables with one header row 206, tables with one header column 208, tables with one header row 206 and one header column 208, tables with a spanned header cell 210, tables with a sub-header row 212, tables with a spanned cell 214, tables with multiple levels of sub-header rows 212, tables with intermediate summary rows or footer rows 216, tables with multiple levels of category and sub-category rows 218, tables with random headings, etc.) Furthermore, tables may contain semi-structured data with various content types such as words, phrases, sentences, lists (e.g., bulleted or numbered), paragraphs, numbers or financials, rich content (e.g., images, graphs, charts), etc.

Referring now to FIG. 3, an example of horizontal narration 300 in accordance with one embodiment is depicted. According to at least one implementation of the present embodiment, horizontal narration may be used to narrate rows of a table (right to left or left to right) including linking the contents in header rows 302 through narration formulas using NLP. Therefore, if rows of a table are to be narrated (left to right for English language, or right to left for certain languages such as Arabic), it is referred to as horizontal narration. A table may have key elements, such as a caption 304, a header row 302, a header column 306, etc. According to at least one implementation, each normal row of a table 308 may be converted to one or more equivalent natural language sentences. Therefore, according to at least one implementation, the cell values in normal rows 308 of a table may be linked to the headers and sub-headers (e.g., header rows 302; header columns 306; category rows 218 (FIG. 2); intermediate summary rows; and footer rows 216 (FIG. 2)) of a table using natural language processing (NLP) concepts using narration formulas.

For example, with respect to FIG. 3, the output following horizontal narration of the marked header rows 302 may be displayed as the following:

For Mutual Fund Fund 1, the Dividend ($ per unit) is $2 and Payout % is 2%.

For Mutual Fund Fund 2, the Dividend ($ per unit) is $4 and Payout % is 1.8%.

For Mutual Fund Fund 3, the Dividend ($ per unit) is $6 and Payout % is 8%.

For Mutual Fund Fund 4, the Dividend ($ per unit) is $20 and Payout % is 15%.

Referring now to FIG. 4, an example of horizontal narration with comparison 400 in accordance with one embodiment is depicted. According to at least one implementation of the present embodiment, horizontal narration with comparison may be used to compare one row or one group of rows of a table (right to left or left to right) with another row (or another group of rows) including linking the contents in header rows 302 through narration formulas using NLP. Therefore, if a table contains multiple rows (or repeating groups of rows), and the horizontal narration for one row (or one group of rows) should be compared with the horizontal narration for another row (or a second group of rows), it is defined as "Horizontal Narration Comparison". However, according to an alternate implementation, the horizontal narration may compare one row of a table with another row (or a set of rows) of the table. As such, the cell values in normal rows of a table may be linked to the headers and sub-headers (e.g., header row 402, row 3 404, and row 5 406); header columns 306; category rows 218 (FIG. 2); intermediate summary rows; and footer rows 216 (FIG. 2)) of a table using natural language processing (NLP) concepts using narration formulas according to the present embodiment.

For example, with respect to FIG. 4, the output following horizontal narration with comparison across row 3 (404) and row 5 (406) may be displayed as the following:

For Mutual Fund Fund 2, the Dividend ($ per unit) is $4 and Payout % is 1.8%.

Whereas

For Mutual Fund Fund 4, the Dividend ($ per unit) is $20 and Payout % is 15%.

Referring now to FIG. 5, an example of vertical narration 500 in accordance with one embodiment is depicted. According to at least one implementation of the present embodiment, vertical narration may be used to narrate columns 502 of a table (top-down or bottom-up) including linking the contents in header rows (302 (FIG. 3)) through narration formulas using NLP. Therefore, if columns 502 of a table are to be narrated in a top-down or bottom-up sequence, it may be referred to as vertical narration. As such, each column 502 of a table may be converted to one or more equivalent natural language sentences. According to at least one implementation, the cell values in normal columns 502 of a table may be linked to the headers and sub-headers (header row 402 (FIG. 4); header columns; 306 (FIG. 3) category rows (218 (FIG. 2); intermediate summary rows; and footer rows (216 (FIG. 2)) of a table using natural language processing (NLP) concepts.

For example, with respect to FIG. 5, the output following vertical narration of the marked columns 502 may be displayed as the following:

Definition for Four Wheeler is Any Vehicle that has 4 wheels such as car, bus, truck, etc.

Policy Type for Four Wheeler is a Four Wheeler Insurance.

Referring now to FIG. 6, an example of vertical narration with comparison 600 in accordance with one embodiment is depicted. According to at least one implementation of the present embodiment vertical narration may be used to narrate columns 502 of a table (top-down or bottom-up) including linking the contents in header rows 602 through narration formulas using NLP. Therefore, if a table contains multiple columns 502 (or repeating groups of columns) which can be vertically narrated, and the vertical narration for one column 502 (or one group of columns) should be compared with the vertical narration for another column (or a second group of columns), it may be defined as "Vertical Narration Comparison". According to another implementation of the present embodiment, the vertical narration may compare one column 608 of a table with another column 610 (or a set of columns) of the table. As such, the cell values in normal cells of column 502 of a table may be linked to the headers and sub-headers (header row 302 (FIG. 3)); header columns 306 (FIG. 3); category rows 218 (FIG. 2); intermediate summary rows; and footer rows 216 (FIG. 2)) of a table using natural language processing (NLP) concepts according to the present embodiment.

For example, with respect to FIG. 6, the output following vertical narration with comparison across the columns 604 (column 2) and 606 (column 3) of a table, may be displayed as the following:

Definition:

Four Wheeler is any vehicle that has 4 wheels such as car, bus, truck, etc.

Whereas

Two Wheeler is any vehicle that has 2 wheels such as bicycle, motorbike, etc.

Policy Type for Four Wheeler is a Four Wheeler Insurance.

Whereas

Policy Type for Two Wheeler is a Bike Insurance.

According to an alternate embodiment, narration formulas for narrating tables corresponding to specified structural and narration templates may be implemented. When a structural template and the applicable narration template are determined for a given table, the narration formula specified in the selected narration template may be "applied" to narrate the given table. As such, a narration formula may consist of a mix of natural language words, phrases, and sentences which can be static (specified within the formula) OR dynamic (based on the contents of a given table) through NLP techniques (such as determination of hypernyms or super-subordinate relationships among cognitive synonyms, preposition classes, plurality, etc.) or based on values specified in other parameters of the narration template. Additionally, variables may be resolved to header cells, normal cells, rows 302 (FIG. 3), columns 502 (FIG. 5) or other structural elements of a table, such that the contents of the element specified by the given variable may be accessed and substituted within the formula.

Additionally, according to the present embodiment, narration formulas may be written in any formula language, code or notation that may be interpreted and resolved at runtime by the narration program. The choice of formula language or notation may be implementation-specific. Examples of narration formulas and their explanations are provided in FIG. 9. These are sample embodiments, and other types of narration formulas may also be defined, with different syntax or notations.

Figure 7:
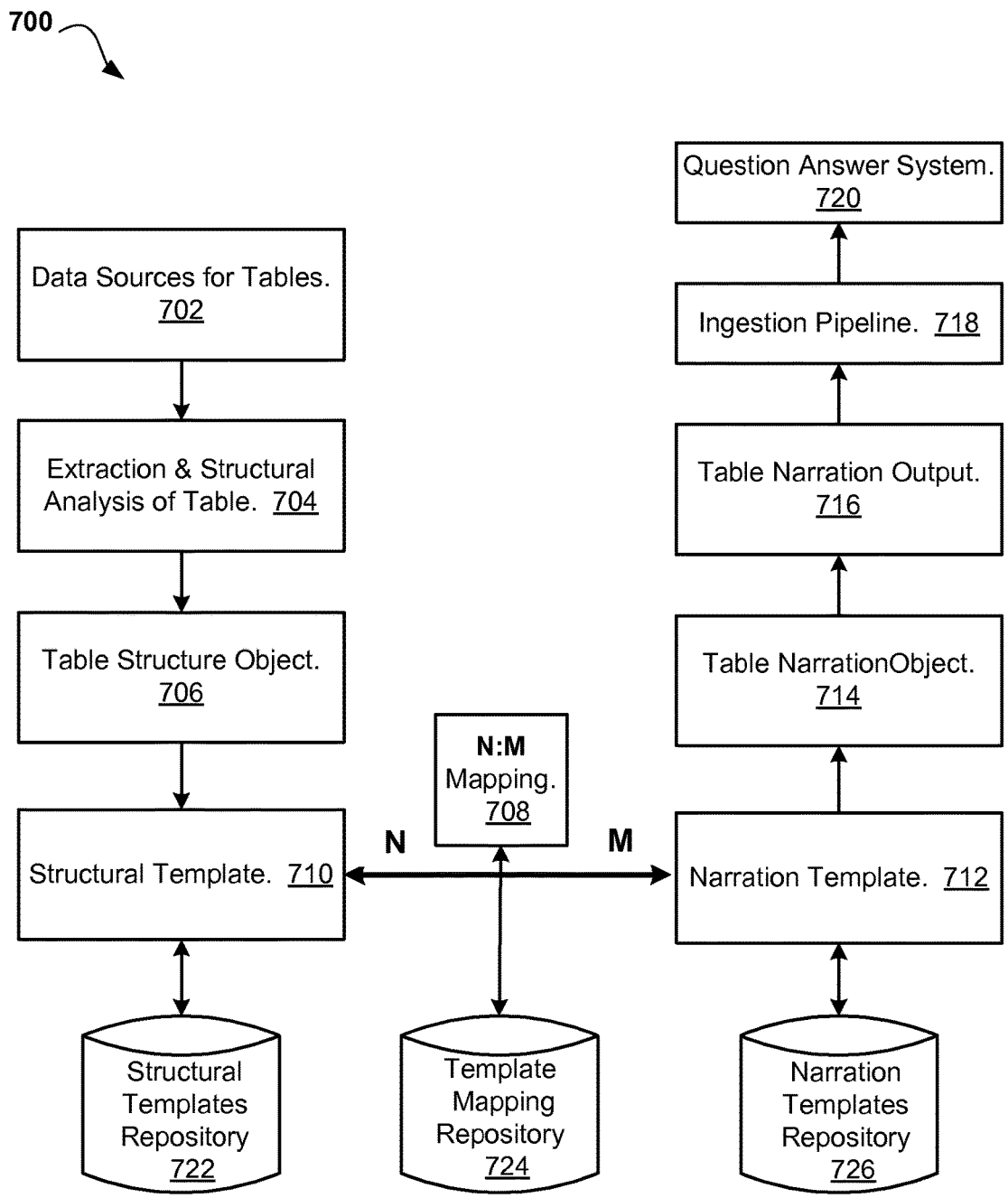
FIG. 7 illustrates a template-based approach for linking structural analysis and narration for tables according to one embodiment.

Referring now to FIG. 7, a template-based approach 700 for linking structural analysis and narration for tables in accordance with one embodiment is depicted. The method may include data sources for tables 702; extraction and structural analysis of a table 704; a table structure object 706; and mapping 708. The method may further include a structural template 710; a narration template 712; a table narration object 714; a table narration output 716; an ingestion pipeline 718; and a question answer system 720. The method may further include the storing of templates in repositories, such as a structural templates repository 722; a template mapping repository 724; and a narration templates repository 726.

For example, according to the present embodiment, at 702, a table may be located in source documents or web pages. Then at 704, extraction and structural analysis of the table may be performed. As such, the tables in the source documents or web pages may be extracted, parsed and analyzed for their structure and layout.

Then at 706, the table structure object may be determined. As such, based on the previous structural analysis of the table and using the structural templates repository 722, the applicable "structural template" may be determined. The "structural template" may depict the key elements (i.e., schema) of the table structure that may be necessary to determine the applicable narration templates. Then, at 708, based on the structural template determined for the given table, the set of (one or more) applicable narration templates may be determined by looking up the "template mapping" in the template mapping repository 724. Therefore, at 710, each structural template may be mapped to one or more narration templates and at 712 each narration template may be mapped to one or more structural templates.

Furthermore, for a given structural template, if more than one narration template may be applicable, then additional rules or criteria may be used to downselect or select one narration template from the set of applicable narration templates 726. The given table may be narrated by the method of "applying" the selected narration template to the table at 714 to get the resultant table narration at 716. As such, the present embodiment may provide flexibility for table narration in an ingestion pipeline 718 for use in a question answering system 720.

For example, according to the present embodiment, schema, templates and mapping of narration templates may be implemented as follows:

Schema

Narration Schema: This may contain the key elements (including NLP elements) for defining narration templates, including a narration formula (according to one implementation) which may be based on NLP concepts.

Structural Schema: This may contain the key elements of a table structure which may be required for determining the relevant narration templates that may be applicable for a given table. The structural schema may or may not represent the entire table structure, since the entire table structure may not be required to determine the mapping between a structural template and a narration template.

Mapping Schema: This may contain the key elements required to map a narration template to a structural template (and vice versa). The mapping schema may also contain certain elements such as domain name or client name which may be used to differentiate a set of narration templates from other narration templates for the same structural table schema.

Template

Narration Template: This may comply with the Narration Schema, and defines the narration elements (including NLP elements) which are used to derive the narration of a given table.

Structural Template: This may comply with the Structural Schema, and defines the structural elements of a table which are relevant for deriving the corresponding table narration.

Mapping Template: This may comply with the Mapping Schema, and is used to map the structural templates to the narration templates (and vice versa).

According to one embodiment, an example of one implementation depicting the structural schema may be as follows:

| Schema Element | Description | Element Type/ Data Type |
|---|---|---|
| Table Structure Template | This is a complex element containing the structural template name and template version. | Complex Element |
| Table Structure Template Name | This is the name of the structural template; it may be the same as the filename (with or without the file extension), or any other name which uniquely identifies the template. | String |
| Table Structure Template Version | The template version identifies the version of the template, and can be used for version control. | String |
| Table Structural Pattern | This is a complex element containing all the child elements for the structural pattern representing a table. Only those structural elements of a table which are required to identify the corresponding narration templates are included in this structural pattern. | Complex type |
| Table Structural Pattern Name | This is the name of the structural pattern, and should be a unique name. | String |
| Table Header Row Exists | This indicates whether the table contains a header row, and may be a Boolean (Yes/No) type of value. | String (Yes/No) |
| Table Header Row SubHeader Exists | This indicates whether the table contains sub-header rows, and may be a Boolean (Yes/No) type of value. | String (Yes/No) |
| Table Header Row SubHeader Levels | If the table contains sub-header rows, then this indicates the number of sub-levels. If the table does not contain sub-header rows, the value would be zero. | Integer |
| Table Header Row SubHeader First Cell Blank | In many cases, the cell at the intersection of the sub-header rows and the first column of the table is blank. This element indicates if the cell is blank or not, and may be a Boolean (Yes/No) type of value. | String (Yes/ No/NA) |
| Table Header Column Exists | This indicates whether the table contains a header column, and may be a Boolean (Yes/No) type of value. | String (Yes/No) |
| Table Header Column SubHeader Exists | This indicates whether the table contains sub-header columns, and may be a Boolean (Yes/No) type of value. | String (Yes/No) |
| Table Header Column SubHeader Levels | If the table contains sub-header columns, then this indicates the number of sub-levels. If the table does not contain sub-header columns, the value would be zero. | Integer |
| Table Header Column SubHeader First Cell Blank | In many cases, the cell at the intersection of the sub-header columns and the first row of the table is blank. This element indicates if the cell is blank or not, and may be a Boolean (Yes/No) type of value. | String (Yes/ No/NA) |
| Table Header Row Maximum Column Span | This indicates the maximum column span for a header row. The value would be 1 if the table does not contain any spanned columns. | Integer |
| Table Header Column Maximum Row Span | This indicates the maximum row span for a header column. The value would be 1 if the table does not contain any spanned rows. | Integer |
| Table Header Row Group Exists | This indicates whether the table contains a header row and groups of repeating columns, and may be a Boolean (Yes/No) type of value. | String (Yes/No) |
| Table Header Row Group Start Column | If the table contains groups of repeating columns, then this indicates the column number where the repeating group starts (the first column of the first repeating group). A value of 0 indicates that there is no repeating group of columns in the table. Example - (a) if the table contains 4 columns with a repeating group of 2 columns (A B A B), then the starting column number is 1. (b) If the repeating pattern is (C1 A B A B) where the first column C1 is non-repeating, then the start column number for the repeating pattern (A B) is 2. | Integer |
| Table Header Row Group Size | If the table contains groups of repeating columns, then the size of a group (i.e. the number of columns in the repeating group). A value of 0 indicates that there is no repeating group of columns in the table. Example - if the table contains 4 columns with a repeating group of 2 columns (A B A B), then the group size is 2. | Integer |
| Table Header Column Group Exists | This indicates whether the table contains a header column and groups of repeating rows, and may be a Boolean (Yes/No) type of value. | String (Yes/No) |
| Table Header Column Group Start Row | If the table contains groups of repeating rows, then this indicates the row number where the repeating group starts (the first row of the first repeating group). A value of 0 indicates that there is no repeating group of rows in the table. Example - (a) if the table contains 4 rows with a repeating group of 2 rows (X Y X Y), then the starting row number is 1. (b) If the repeating pattern is (H1 X Y | Integer |

| Schema Element | Description | Element Type/ Data Type |
| --- | --- | --- |
| | X Y) where the first row H1 is a header row and non-repeating, then the start row number for the repeating pattern (X Y) is 2. | |
| Table Header Column Group Size | If the table contains groups of repeating rows, then the size of a group (i.e. the number of rows in the repeating group). A value of 0 indicates that there is no repeating group of rows in the table. Example - if the table contains 4 rows with a repeating group of 2 rows (X Y X Y), then the group size is 2. | Integer |
| Table Category Headers Exist | This indicates whether the table contains category rows, and may be a Boolean (Yes/No) type of value. | String (Yes/No) |
| Table Category SubLevels Exist | If the table contains category rows, this indicates if it also has category sub-levels. This may be a Boolean (Yes/No) type of value. | String (Yes/No) |
| Table Category Maximum SubLevels | If the table has category sub-levels, this indicates the maximum number of sub-levels. A value of 0 indicates that the table does not contain category sub-levels. | Integer |
| Table Intermediate Summary Rows Exist | This indicates whether the table contain intermediate summary rows, and may be a Boolean (Yes/No) type of value. (Intermediate summary rows are rows which contain summaries or totals of a set of rows immediately preceding or succeeding them. A common example is invoices or balance sheets where a set of items may have an intermediate total row.) | String (Yes/No) |
| Table Footer Summary Row Exists | This indicates whether the table contains a footer summary row, and may be a Boolean (Yes/No) type of value. (A footer row is the last row of a table which contains summaries or totals of a set of rows preceding it in the table. A common example is invoices or balance sheets where a set of items may have a total in the last row.) | String (Yes/No) |
| Table Random Headings Exist | This indicates whether the table contains randomly placed headings, and may be a Boolean (Yes/No) type of value. (Normal tables may contain a header row as the first row, and each cell of a header row acts as the header cell for the corresponding column. However, there may be table patterns where a cell acts as the heading for a group of cells below it, and such heading cells are not necessarily the first cell in a column. The placement and occurrence of such heading cells may be random.) | String (Yes/No) |

According to another embodiment, an example of one implementation depicting the narration schema may be as follows:

| Schema Element | Description | Element Type/ Data Type |
| --- | --- | --- |
| Table Narration Template | This is a complex element containing the narration template name and template version. | Complex Element |
| Table Narration Template Name | This is the name of the narration template; it may be the same as the filename (with or without the file extension), or any other name which uniquely identifies the template. | String |
| Table Narration Template Version | The template version identifies the version of the template, and can be used for version control. | String |
| Table Narration Pattern | This is a complex element containing all the child elements for the narration pattern for a table. | Complex Element |
| Table Narration Pattern Name | This is the name of the narration pattern, and should be a unique name. | String |
| Table Narration Header Row Type | For tables containing a header row, this element defines the type of text contained within the cells of the header row. The text could be a noun phrase, or it could start with a preposition, or it could be numeric. In case a table does not contain a header row, this element can have the value of 'Not Applicable'. Other values can be defined as required. | String |
| Table Narration Header Row SubHeader Type | For tables containing sub-header rows, this element defines the type of text contained within the cells of the sub-header rows. The text could be a noun phrase, or it could start with a preposition, or it could be numeric. In case a table does not contain a sub-header row, this | String |

| Schema Element | Description | Element Type/Data Type |
|---|---|---|
| | element can have the value of 'Not Applicable'. Other values can be defined as required. | |
| Table Narration Header Column Type | For tables containing a header column, this element defines the type of text contained within the cells of the header column. The text could be a noun phrase, or it could start with a preposition, or it could be numeric. In case a table does not contain a header column, this element can have the value of 'Not Applicable'. Other values can be defined as required. | String |
| Table Narration Header Column SubHeader Type | For tables containing sub-header columns, this element defines the type of text contained within the cells of the sub-header columns. The text could be a noun phrase, or it could start with a preposition, or it could be numeric. In case a table does not contain a sub-header column, this element can have the value of 'Not Applicable'. Other values can be defined as required. | String |
| Table Narration Header Class | The header class is the hypernym (parent class or category) that the text in the first cell of the header row belongs to. For example, if the first cell of a header row contains the text "Age", then the header class could be an "attribute". Other values of header classes may be defined as required, for example "set", "measure", "communication", etc. If the header class is not applicable, its value can be set to 'Not Applicable'. (REFERENCE: Wordnet [wordnet.princeton.edu/wordnet/] uses hypernyms and provides super-subordinate relations (also called hyperonymy, hyponymy or ISA relation) among cognitive synonyms or synsets.) | String |
| Table Narration Header Row Plurality | This element indicates the plurality of the text contained within the cells of the header row. The text phrase or sentence may be singular or plural. For numeric or other types of non-textual content, the value may be "NA" (Not Applicable). Other types of values may be defined if required. | String |
| Table Narration Header Column Plurality | This element indicates the plurality of the text contained within the cells of the header column. The text phrase or sentence may be singular or plural. For numeric or other types of non-textual content, the value may be "NA" (Not Applicable). Other types of values may be defined if required. | String |
| Table Narration Preposition Class | This element specifies the classes into which prepositions can be categorized. Values may be defined as required. (REFERENCE: Preposition Classes are defined by The Preposition Project - www.clres.com/prepositions.html) | String |
| Table Narration Category Header Type | For tables containing category rows, this element defines the type of text contained within the cells of the category rows. The text could be a noun phrase, or it could start with a preposition, or it could be numeric. In case a table does not contain a category row, this element can have the value of 'Not Applicable'. Other values can be defined as required. | String |
| Table Narration Category SubLevel Type | For tables containing category row sub-levels, this element defines the type of text contained within the cells of the category sub-levels. The text could be a noun phrase, or it could start with a preposition, or it could be numeric. In case a table does not contain a category sub-levels, this element can have the value of 'Not Applicable. Other values can be defined as required. | String |
| Table Narration Category Header Plurality | This element indicates the plurality of the text contained within the cells of the category rows. The text phrase or sentence may be singular or plural. For numeric or other types of non-textual content, the value may be 'Not Applicable'. Other types of values may be defined if required. | String |
| Table Narration Sequence | This element indicates the narration sequence for a table. Possible values are: Horizontal: If rows of a table are to be narrated (left to right for English language, or right to left for certain languages such as Arabic), it is referred to as horizontal narration. Vertical: If columns of a table are to be narrated in a top-down sequence, it is referred to as vertical narration. | String |

| Schema Element | Description | Element Type/ Data Type |
|---|---|---|
| | Horizontal-Compare: If a table contains repeating groups of rows, and the horizontal narration for one group of rows should be compared with the horizontal narration for another group of rows, it is referred to as "Horizontal Comparison Narration". Another variation of this could be that the horizontal narration compares one row of a table with another row (or a set of rows) of the table. Vertical-Compare: If a table contains repeating groups of columns, and the vertical narration for one group of columns should be compared with the vertical narration for another group of columns, it is referred to as "Vertical Comparison Narration". Another variation of this could be that the vertical narration compares one column of a table with another column (or a set of columns) of the table. | |
| Table Maximum Rows | This indicates the maximum number of rows in a table. For some types of narration templates (such as narration of tables with a single row without header rows), this is an important parameter to define the narration formula. A default value of 0 or −1 (or any non-positive integer) for this parameter would indicate that this parameter is not applicable. A positive integer value (1, 2, 100, etc) would indicate the maximum number of rows for which the narration template would be applicable. | Integer |
| Table Maximum Columns | This indicates the maximum number of columns in a table. For some types of narration templates (such as narration of tables with a single column), this is an important parameter to define the narration formula. A default value of 0 or −1 (or any non-positive integer) for this parameter would indicate that this parameter is not applicable. A positive integer value (1, 2, 100, etc) would indicate the maximum number of columns for which the narration template would be applicable. | Integer |
| Table Narration Footer Summary Type | For tables containing footer rows, this element defines the type of text contained within the cells of the footer rows. The text could be a noun phrase or sentence, or it could start with a preposition, or it could be numeric. In case a table does not contain a footer row, this element can have the value of 'Not Applicable'. Other values can be defined as required. | String |
| Table Narration Footer Summary Class | The footer summary class is the hypernym (parent class or category) that the text in the cells of the footer row belongs to. For example, if the footer row contains the summation of values in the preceding rows of the table, then the footer summary class could be "quantitative relation". Other values of footer summary classes may be defined as required, for example "set", "measure", "communication", etc. If the footer summary class is not applicable, its value can be set to 'Not Applicable'. (REFERENCE: Wordnet [wordnet.princeton.edu/wordnet/] uses hypernyms and provides super-subordinate relations (also called hyperonymy, hyponymy or ISA relation) among cognitive synonyms or synsets.) | String |
| Table Narration Cell Value Type | This element defines the type of text contained within each normal cell of a table. This is an essential parameter, since during narration using our proposed approach, the contents of each cell of a table are correlated with the header rows/header columns/footer rows, etc using natural language processing (NLP) concepts, in determining the cell level narration or row level narration. The text within a cell could be a noun phrase, a sentence, a list (such as a bulleted list or a numbered list), the text could start with a preposition or the text could be numeric. In case the table cell does not contain a value (is blank), this element can have the value of 'Not Applicable'. Other values can be defined as required. | String |
| Table Cell Level Narration Formula | This element represents a cell-level narration formula. Such formulas can be applied to individual table cells to narrate the cell contents. | String |

| Schema Element | Description | Element Type/Data Type |
|---|---|---|
| | Default value is "NIL" if the formula is not defined at the cell level. Some types of narration templates may not have cell-level narrations. If the formula is defined, then this element will contain the formula as a text string. | |
| Table Row Level Narration Formula | This element represents a row-level narration formula. Such formulas can be applied to table rows to narrate the row contents. A row level narration formula may be applied to each normal row of a table (excluding header rows or category rows or footer rows) to produce a row-level narration. The narration may be a sentence. Thus each normal row of a table may be narrated into (one or more) sentences using the row level narration formula. Default value is "NIL" if the formula is not defined at the row level. Some types of narration templates may not need row-level narrations. If the formula is defined, then this element will contain the formula as a text string. | String |
| Table Footer Level Narration Formula | This element represents a row-level narration formula for footer rows or intermediate summary rows. Such formulas may be applied to footer rows or intermediate summary rows to narrate the row contents. Since footer rows or intermediate summary rows are special types of rows in a table, the footer level narration formula defined by this element may not be used for other normal rows of a table. Default value is "NIL" if the formula is not defined. Most types of tables do not contain footers, and the corresponding narration templates may not have footer-level narrations. If the formula is defined, then this element will contain the formula as a text string. | String |

According to yet another embodiment, an example of one implementation depicting the mapping schema may be as follows:

| Schema Element | Description | Data Type | Minimum/Maximum Occurrences |
|---|---|---|---|
| Map Table Structure Narration | This is a complex element containing the mapping template name and template version. | Complex Element | 1 |
| Map Name | Mapping template name; same as the filename (without file extension.) | String | 1 |
| Map Version | Mapping Template version. | String | 1 |
| Table Structure Narration Mapping | This is a complex element containing the mapping between structural templates and narration templates. Each mapping file can contain one or multiple mapping elements. One mapping element can be used to map one structural template to one or multiple narration templates. If the mapping is specific to a domain or to a specific company/customer/client, these parameters can also be specified as part of this element. | Complex Element | Min = 1 Max = ANY |
| Table Structure Template Name | The name of a structural template. This name should match the name specified within the structural template file. A variation of this implementation may have the filename as the name of the structural template. Each mapping element ("Table Structure Narration Mapping") can have exactly one structural template name. Thus, each structural template can be mapped to one or more narration templates. | String | 1 |
| Table Narration Template Name | The name of a narration template. This name should match the name specified within the narration template file. A variation of this implementation may have the filename as the name of the narration template. Each mapping element ("Table Structure Narration Mapping") can have one or multiple narration template names. | String | Min = 1 Max = ANY |

| Schema Element | Description | Data Type | Minimum/ Maximum Occurrences |
| --- | --- | --- | --- |
| Mapping Domain Name | This element specifies a domain name for the mapping element ("Table Structure Narration Mapping"), for example, "generic", "telecom", "healthcare", etc. The default value is "generic", which means that the mapping of structural and narration templates is valid for all domains/is not restricted to any specific domain. Each mapping element ("Table Structure Narration Mapping") may have one or more domain names associated with it. This enables a structural template and its associated mapping templates to be associated with the specified domains. | String | Min = 1 Max = ANY |
| Mapping Client Name | This element specifies a company/customer/ client name for the mapping element ("Table Structure Narration Mapping"), for example, "all", "IBM", etc. The default value is "all", which means that the mapping of structural and narration templates is valid for all companies/customers and is not restricted to any specific company. Each mapping element ("Table Structure Narration Mapping") may have one or more company or client names associated with it. This enables a structural template and its associated mapping templates to be associated with the specified companies or clients. | String | Min = 1 Max = ANY |

The foregoing schema definitions may be considered as a sample implementation of the present embodiment. As such, the foregoing schema definitions may vary for other implementations such that new elements or parameters may be added to the proposed schemas; certain elements or parameters discussed herein may be customized or modified; and certain elements or parameters discussed herein may be excluded or made optional. Therefore, different schemas may be defined for specific domains, for specific clients, or for specific criteria. According to at least one implementation, XSD (XML Schema Definition) may be utilized to define schemas. Also, XML (Extended Markup Language) may be utilized to define the structural and narration templates and the mapping file. Furthermore, each XML template file can comply with the corresponding XSD schema and multiple templates (XML) can be defined for the same XSD Schema.

Figure 8A:
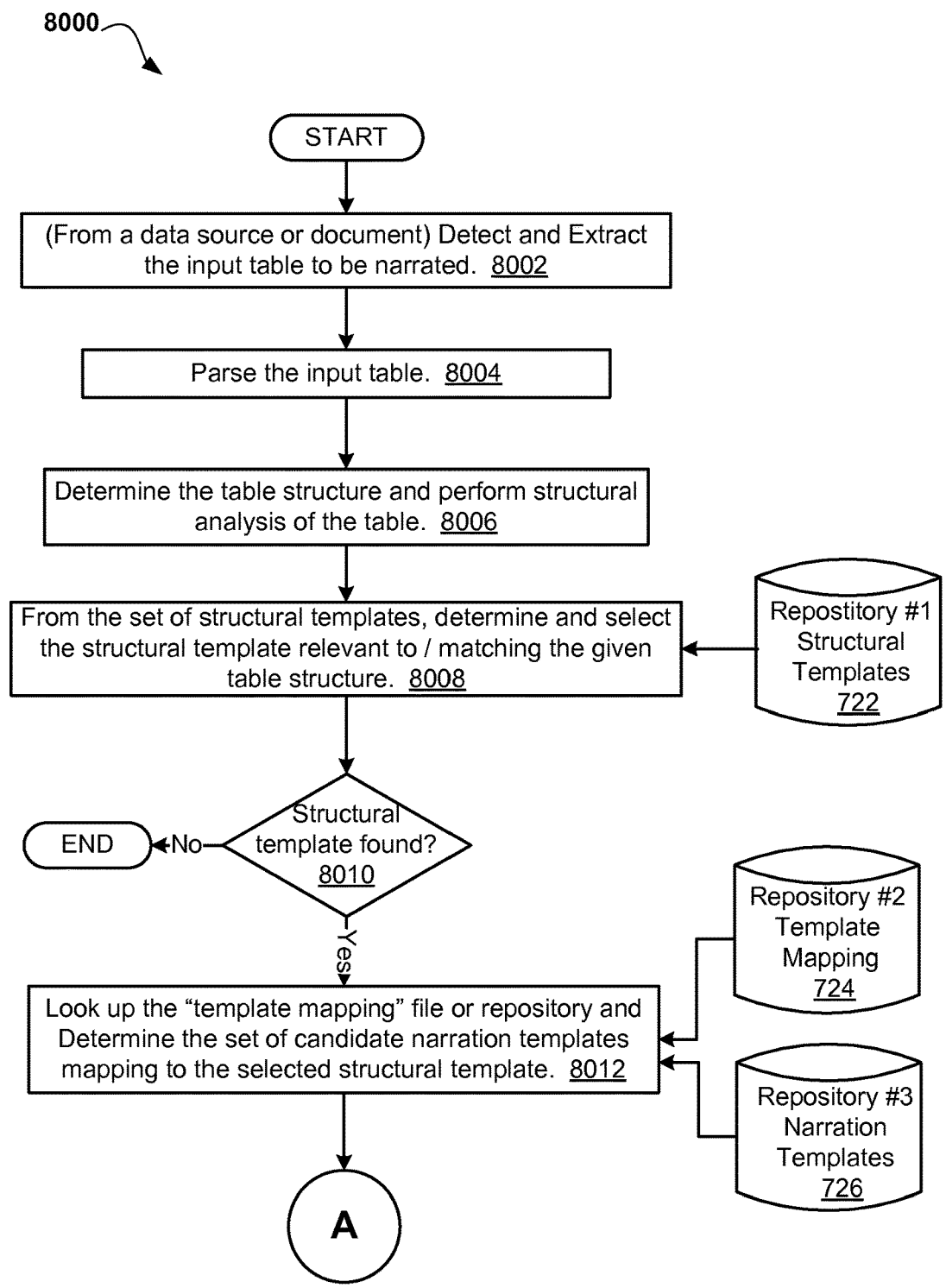
FIGS. 8A-8B is an operational flowchart illustrating the steps carried out by a program for narrating a table using narration templates according to at least one embodiment.
Figure 8B:
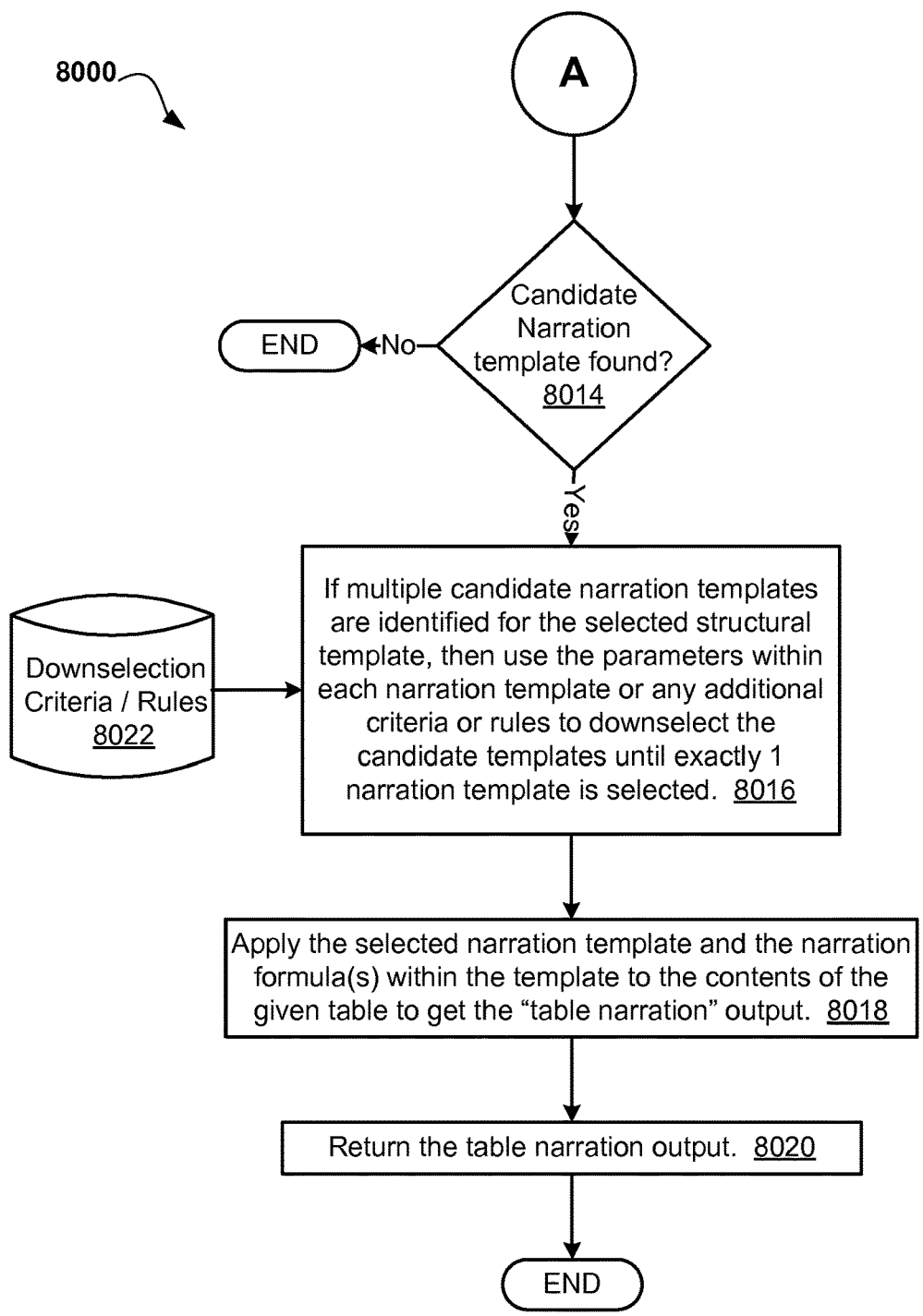

Referring now to FIGS. 8A-8B, an operational flowchart 8000 illustrating the steps carried out by a program for narrating a table using narration templates in accordance one embodiment is depicted. At 8002, the input table to be narrated may be detected and extracted from a data source, such as a document. For example, a user using a computer 102 (FIG. 1) may utilize the table narration program 108A (FIG. 1) to extract the table contents associated with a table from a source document or web page so that the extracted table may be narrated.

Then at 8004, the input table may be parsed. As such, the table structure and table contents may be parsed to determine whether the table has certain fields such as a header, columns, or rows, etc.

Next, at 8006 the table structure may be determined and the structural analysis of the table may be performed. Therefore, based on the parsing of the table contents from the previous step 804, the table structure may be analyzed to determine the layout of the table. For example, table narration program 108A (FIG. 1) may analyze the previously parsed fields, such as rows or columns that are associated with the table. Furthermore, table narration program 108A (FIG. 1) may determine how many rows or how many columns are contained in the table. Therefore, the contents and layout of the table may be determined based on the structural analysis.

Then at 8008, the structural template that is relevant to or matching the given table structure may be determined and selected from the set of structural templates (i.e., the structural template repository 722). As such, the table structure and the analysis from the previous step 806 is compared to the structural templates contained in the structural templates repository 722 so that a matching structural template contained in the repository 722 may be determined.

Next, at 8010 it is determined whether a structural template is found. The structural template may depict the key elements (i.e., schema) of the table structure that may be necessary to determine the applicable narration templates. If at 8010, it is determined that a structural template is not found, then the method may terminate. However, if at 8010, it is determined that a structural template is found, then at 8012 the method may search the "template mapping" file (i.e., template mapping repository 724) to determine the set of candidate narration templates (from the narration templates repository 726) that may map to the selected structural template. As such, based on the structural template determined for the given table, the set of (one or more) applicable narration template candidates may be determined by looking up the "template mapping" in the template mapping repository 724. Therefore, each structural template may be mapped to one or more narration templates and each narration template may be mapped to one or more structural templates.

Then, at 8014 it is determined whether a candidate narration template is found. If at 8014, it is determined that a candidate narration template is not found, then the method may terminate. However, if at 8014, it is determined that a candidate narration template is found, then at 8016 the method may select exactly one narration template if multiple candidate narration templates were identified. As such, if multiple candidate narration templates are identified for the selected structural template, then the method may use the parameters within each narration template or any additional criteria or rules from the downselection criteria/rules repository 8022 to downselect the candidate templates until exactly one narration template is selected. Therefore, for a given structural template, if more than one narration template may be applicable, then additional rules or criteria may be used to downselect or select one narration template from the set of applicable narration template candidates. However, if only one candidate narration template was previously identified (from step 8012), then according to one implementation, the method may skip step 816 and proceed directly to step 8018.

Next, at 8018 the method may apply the selected narration template, the structural template, and the narration formula(s) within the template to the contents of the given table to determine the "table narration" output. As such, the given table may be narrated by the method of "applying" the selected narration template to the table to get the resultant table narration. Then, at 8020 the method may return the table narration output.

Additionally, implementations of the present embodiment may be generic, flexible and scalable, and may be used to narrate a wide variety of tables with different types of structural patterns and content. Therefore, if the implementation or code supports a specific template schema, then all narration templates based on the defined schema may be supported by the implementation. Additionally, natural language processing (NLP) concepts may be used to define the narration formulas. As such, narration may be improved by updating the narration formula in the narration template, which may not require any code changes. Also, new narration templates may be defined or existing templates may be modified without changes to the code.

Furthermore, according to one implementation, schemas may be defined using existing constructs such as XSD (XML Schema Definition) or DTD (Document Type Descriptor) and templates (structural and narration templates and mapping files) may be defined using XML. Thus, XML and XSD files may be treated as "resource files" in a codebase. Additionally, resource files may be updated or new resource files may be added without changes to the existing codebase. As such, the present embodiment may provide flexibility for table narration in an ingestion pipeline 718 (FIG. 7) for use in a question answering system 720 (FIG. 7), such as, IBM Watson.

Referring now to FIG. 9, examples of narration formulas 9000 in accordance with one embodiment is depicted. According to at least one implementation, narration formulas may be defined at multiple levels. The narration formulas may be implemented as generic, and the narration formulas may be defined in various ways with different scopes (within a table, within a region comprising multiple tables, etc.). According to at least one implementation of the present embodiment, narration formulas may be utilized for narrating tables corresponding to specified structural and narration templates. As such, when a structural template and the applicable narration template are determined for a given table (as previously described), the narration formula specified in the selected narration template can be "applied" to narrate the given table. A narration formula may consist of a mix of natural language words, phrases, or sentences which can be static (specified within the formula) or dynamic (based on the contents of a given table) through NLP techniques (such as determination of hypernyms or super-subordinate relationships among cognitive synonyms, preposition classes, plurality, etc.) or based on values specified in other parameters of the narration template). Furthermore, variables may be resolved to header cells, normal cells, rows, columns or other structural elements of a table, such that the contents of the element specified by the given variable can be accessed and substituted within the formula. The following are examples of narration formulas that correlate to the examples depicted in FIG. 9, however, the following examples are generic, and narration formulas can be defined in various ways with different scopes (within a table, within a region comprising multiple tables, etc.).

Cell Level Narration Formula 902: This may apply at an individual cell level, applicable to normal cells and header cells of any type (normal cells, spanned cells, merged cells, etc.)

Row Level Narration Formula 904: This may apply at an individual row level, applicable to normal rows. The row-level formula may include formula elements (notations, words/phrases, variables, etc.) which are based on NLP concepts. For horizontal narration, the row level formula may be applied to horizontal rows. For vertical narration, the row level formula may be applied to columns.

Column Level Narration Formula: A separate column-level narration formula may not be necessary, but may be specified based on implementation logic. For vertical narration, the row level narration formula may be applied to columns.

Footer Level Narration Formula: This may apply to intermediate summary rows or footer rows, and is similar to row-level narration formulas. If the entire footer is a single cell, a cell-level narration formula can also be applied.

Figure 10:
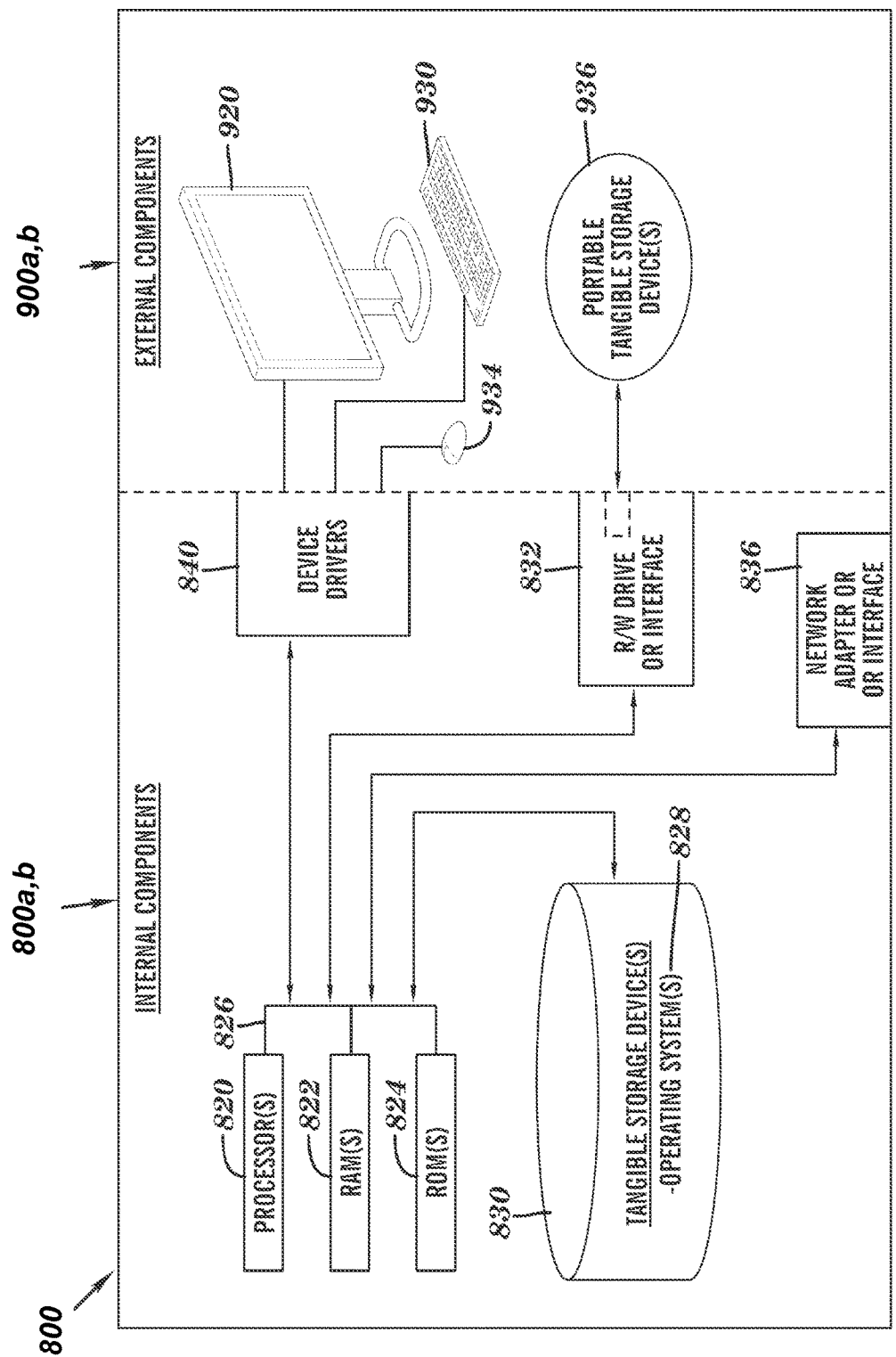
FIG. 10 is a block diagram of internal and external components of computers and servers depicted in FIG. 1 according to at least one embodiment.

FIG. 10 is a block diagram 800 of internal and external components of computers depicted in FIG. 1 in accordance with an illustrative embodiment of the present invention. It should be appreciated that FIG. 10 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 800a, b and external components 900a,b illustrated in FIG. 10. Each of the sets of internal components 800a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and table narration program 108A (FIG. 1) in client computer 102 and table narration program 108B in network server computer 112 are stored on one or more of the respective computer-readable tangible storage devices 830 for execution by one or more of the respective processors 820 via one or more of the respective RAMs 822 (which typically include cache memory). In the embodiment illustrated in FIG. 10, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a,b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as table narration program 108A and 108B, can be stored on one or more of the respective portable computer-readable tangible storage devices 936, read via the respective R/W drive or interface 832 and loaded into the respective hard drive 830.

Each set of internal components 800a, b also includes network adapters or interfaces 836 such as a TCP/IP adapter cards, wireless Wi-Fi interface cards, or 3G or 4G wireless interface cards or other wired or wireless communication links. The table narration program 108A in client computer 102 and table narration program 108B in network server 112 can be downloaded to client computer 102 from an external computer via a network (for example, the Internet, a local area network or other, wide area network) and respective network adapters or interfaces 836. From the network adapters or interfaces 836, the table narration program 108A in client computer 102 and the table narration program 108B in network server computer 112 are loaded into the respective hard drive 830. The network may comprise copper wires, optical fibers, wireless transmission, routers, firewalls, switches, gateway computers and/or edge servers.

Each of the sets of external components 900a,b can include a computer display monitor 920, a keyboard 930, and a computer mouse 934. External components 900a,b can also include touch screens, virtual keyboards, touch pads, pointing devices, and other human interface devices. Each of the sets of internal components 800a,b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for narrating a table using at least one narration template, wherein the table is extracted from a data source, the computer system comprising: one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

parsing, by a computing device, the extracted table;

performing, by the computing device, structural analysis on the parsed extracted table, wherein performing the structural analysis comprises determining a table layout and schema associated with the extracted table, and wherein determining the table layout comprises determining a number of rows, a number of columns, a number of headers, a number of sub-headers, a number of categories and a size and a span associated each of the determined number of rows, the determined number of columns, the determined number of headers, the determined number of sub-headers, and the number of categories;

selecting, by the computing device, at least one structural template associated with a plurality of stored structural templates based on the structural analysis of the parsed extracted table, wherein the selected at least one structural template is associated with the determined table layout and schema;

selecting, by the computing device, the at least one narration template associated with a plurality of stored narration templates based on the at least one selected structural template;

applying, by the computing device, the at least one selected narration template to the extracted table, wherein applying the at least one selected narration template to the extracted table comprises applying a plurality of narration formulas specified in the selected narration template, and wherein the plurality of narration formulas comprise a plurality of natural language words, phrases, and sentences that is static as specified within a narration formula or dynamic based on a plurality of content associated with the extracted table, and wherein the plurality of narration formulas continue to be created, updated, and maintained separately, in a repository on a server;

resolving, by the computing device, a plurality of variables associated with the extracted table, wherein the resolving comprises comparing at least one row of the extracted table with at least one other row of the extracted table;

narrating, by the computing device, the extracted table based on the applying of the at least one selected narration template to the extracted table and based on the resolving of the plurality of variables associated with the extracted table; and displaying, by the computing device, a narrative output, the narrative output being a natural language output, based on a horizontal narration with comparison of the at least one row of the extracted table with the at least one other row of the extracted table, wherein the displayed narrative output comprises displaying a first table narration output of the at least one row as compared to a displayed second narration output of the at least one other row.

2. The computer system of claim 1, wherein the at least one selected structural template comprises at least one key element of the table structure that is necessary to determine the at least one selected narration template.

3. The computer system of claim 1, wherein the at least one selected narration template is based on a mapping of the at least one selected structural template to the at least one selected narration template.

4. The computer system of claim 3, wherein the mapping is based on at least one key element required to map the least one selected structural template to the at least one selected narration template.

5. The computer system of claim 1, wherein the at least one selected structural template is based on a mapping of the at least one selected narration template to the at least one selected structural template.

6. The computer system of claim 5, wherein the mapping is based on at least one key element required to map the at least one selected narration template to the at least one selected structural template.

7. The computer system of claim 1, wherein the at least one selected narration template comprises at least one key element for defining the at least one selected narration template.

8. The computer system of claim 7, wherein the at least one key element comprises at least one of an natural language processing (NLP) element and a narration formula.

9. A computer program product for narrating a table using at least one narration template, wherein the table is extracted from a data source, the computer program product comprising:

one or more computer-readable storage devices and program instructions stored on at least one of the one or more tangible storage devices, the program instructions executable by a processor, the program instructions comprising:

program instructions to parse, by a computing device, the extracted table;

program instructions to perform, by the computing device, structural analysis on the parsed extracted table, wherein performing the structural analysis comprises determining a table layout and schema associated with the extracted table, and wherein determining the table layout and schema comprises determining a number of rows, a number of columns, a number of headers, a number of sub-headers, a number of categories and a size and a span associated each of the determined number of rows, the determined number of columns, the determined number of headers, the determined number of sub-headers, and the number of categories;

program instructions to select, by the computing device, at least one structural template based on the structural analysis of the parsed extracted table, wherein the selected at least one structural template is associated with the determined table layout and schema;

program instructions to select, by the computing device, the at least one narration template based on the at least one selected structural template;

program instructions to apply, by the computing device, the at least one selected narration template to the extracted table, wherein applying the at least one selected narration template to the extracted table comprises applying a plurality of narration formulas specified in the selected narration template, and wherein the plurality of narration formulas comprise a plurality of natural language words, phrases, and sentences that is static as specified within a narration formula or dynamic based on a plurality of content associated with the extracted table, and wherein the plurality of narration formulas continue to be created, updated, and maintained separately, in a repository on a server;

program instructions to resolve, by the computing device, a plurality of variables associated with the extracted table, wherein the resolving comprises comparing at least one row of the extracted table with at least one other row of the extracted table;

program instructions to narrate, by the computing device, the extracted table based on the applying of the at least one selected narration template to the extracted table and based on the resolving of the plurality of variables associated with the extracted table; and program instructions to display, by the computing device, a narrative output, the narrative output being a natural language output, based on a horizontal narration with comparison of the at least one row of the extracted table with the at least one other row of the extracted table, wherein the displayed narrative output comprises displaying a first table narration output of the at least one row as compared to a displayed second narration output of the at least one other row.

10. The computer program product of claim 9, wherein the at least one selected structural template comprises at least one key element of the table structure that is necessary to determine the at least one selected narration template.

11. The computer program product of claim 9, wherein the at least one selected narration template is based on a mapping of the at least one selected structural template to the at least one selected narration template.

12. The computer program product of claim 9, wherein the at least one narration template comprises a footer level narration formula.

* * * * *